United States Patent
Lee et al.

(10) Patent No.: US 11,576,015 B2
(45) Date of Patent: Feb. 7, 2023

(54) METHOD FOR TRANSMITTING SIGNAL BY TERMINAL FOR V2X COMMUNICATION IN WIRELESS COMMUNICATION SYSTEM, AND DEVICE USING SAME METHOD

(71) Applicant: LG Electronics Inc., Seoul (KR)

(72) Inventors: Jongyoul Lee, Seoul (KR); Hanbyul Seo, Seoul (KR); Hyukjin Chae, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/480,215

(22) PCT Filed: Jan. 23, 2018

(86) PCT No.: PCT/KR2018/000965
§ 371 (c)(1),
(2) Date: Jul. 23, 2019

(87) PCT Pub. No.: WO2018/135920
PCT Pub. Date: Jul. 26, 2018

(65) Prior Publication Data
US 2020/0008025 A1 Jan. 2, 2020

Related U.S. Application Data

(60) Provisional application No. 62/449,561, filed on Jan. 23, 2017.

(51) Int. Cl.
*H04W 4/40* (2018.01)
*H04W 28/26* (2009.01)
*H04W 4/06* (2009.01)

(52) U.S. Cl.
CPC ............ *H04W 4/40* (2018.02); *H04W 4/06* (2013.01); *H04W 28/26* (2013.01)

(58) Field of Classification Search
USPC ........................................................ 370/328
See application file for complete search history.

(56) References Cited

U.S. PATENT DOCUMENTS

| 2017/0006586 A1* | 1/2017 | Gulati | H04W 72/0413 |
| 2017/0054540 A1* | 2/2017 | Kim | H04W 4/70 |

(Continued)

FOREIGN PATENT DOCUMENTS

WO WO2016204592 12/2016

OTHER PUBLICATIONS

Qualcomm Incorporated, "Support for traffic with smaller periodicity on sidelink based V2V," R2-167884, 3GPP TSG-RAN WG2 Meeting #96, Reno, USA, dated Nov. 5, 2016, 7 pages.

(Continued)

*Primary Examiner* — Gregory B Sefcheck
*Assistant Examiner* — Majid Esmaeilian
(74) *Attorney, Agent, or Firm* — Fish & Richardson P.C.

(57) ABSTRACT

Provided are a method for transmitting a signal by a terminal for vehicle-to-everything (V2X) communication in a wireless communication system, and a terminal using the method. The method comprises: performing first group transmission including first transmission and first retransmission; and performing second group transmission including second transmission and second retransmission, wherein the first group transmission and the second group transmission are performed to transmit data, and a resource reservation period for the first group transmission and the second group transmission is a half of a resource reservation period of another terminal which retransmits the data a maximum of only two times.

12 Claims, 15 Drawing Sheets

(56) References Cited

U.S. PATENT DOCUMENTS

| | | | | |
|---|---|---|---|---|
| 2018/0070264 | A1* | 3/2018 | Saiwai | H04W 72/04 |
| 2018/0139724 | A1* | 5/2018 | Loehr | H04W 72/02 |
| 2018/0324823 | A1* | 11/2018 | Martin | H04L 5/0053 |
| 2019/0007974 | A1* | 1/2019 | Nguyen | H04W 4/44 |
| 2019/0090250 | A1* | 3/2019 | Lee | H04W 72/02 |
| 2019/0116565 | A1* | 4/2019 | Chae | H04W 76/14 |
| 2019/0182827 | A1* | 6/2019 | Wang | H04W 72/0426 |
| 2019/0182840 | A1* | 6/2019 | Feng | H04W 74/0816 |
| 2019/0246249 | A1* | 8/2019 | Lee | H04W 72/02 |

OTHER PUBLICATIONS

Intel Corporation, "On PSCCH and PSSCH retransmission and combining options," R1-167695, 3GPP TSG RAN WG1 Meeting #86, Gothenburg, Sweden, dated Aug. 13, 2016, 7 pages.

InterDigital Communications, "SCI contents for R14 V2V," R1-167590, 3GPP TSG-RAN WG1 Meeting #86, Gothenburg, Sweden, dated Aug. 12, 2016, 4 pages.

InterDigital Communications, "Forward reservation of resources on PSCCH," R1-167588, 3GPP TSG-RAN WG1 Meeting #86, Gothenburg, Sweden, Aug. 12, 2016, 4 pages.

EP Supplementary Search Report in European Application No. EP18741899, dated Dec. 9, 2019, 9 pages.

Huawei, HiSilicon, "Indication of time and frequency resources", R1-166163, 3GPP TSG RAN WG1 Meeting #86, Gothenburg, Sweden, Aug. 22-26, 2016, 4 pages.

Huawei, HiSilicon, "Scheduling assignment design for V2V", R1-166202, 3GPP TSG RAN WG1 Meeting #86, Gothenburg, Sweden, Aug. 22-26, 2016, 4 pages.

* cited by examiner (a)

(b)

METHOD FOR TRANSMITTING SIGNAL BY TERMINAL FOR V2X COMMUNICATION IN WIRELESS COMMUNICATION SYSTEM, AND DEVICE USING SAME METHOD

CROSS-REFERENCE TO RELATED APPLICATIONS

This application is a National Stage application under 35 U.S.C. § 371 of International Application No. PCT/KR2018/000965, filed on Jan. 23, 2018, which claims the benefit of U.S. Provisional Application No. 62/449,561, filed on Jan. 23, 2017. The disclosures of the prior applications are incorporated by reference in their entirety.

BACKGROUND OF THE INVENTION

Field of the Invention

The present invention relates to wireless communication and, more particularly, to a method for transmitting a signal by a user equipment for V2X communication in a wireless communication system and a communication apparatus for using the method.

Related Art

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication.

A new communication system design is under consideration, which takes into account services or terminals sensitive to reliability and latency; the next-generation radio access technology which supports enhanced mobile broadband communication, massive MTC, Ultra-Reliable and Low Latency Communication (URLLC), and so on may be referred to as a new RAT or new radio (NR).

Meanwhile, the NR may support vehicle-to-everything (V2X) communication. The V2X communication refers to a communication between a terminal (or user equipment (UE)) being installed in a vehicle and a random terminal (or UE).

However, in the NR, in case a dedicated frequency resource for V2X communication cannot be allocated and a same band as the legacy LTE frequency resource is used, it will be preferable to satisfy backward compatibility with vehicle-to-vehicle (V2V) communication with the legacy LTE. Considering the above-described characteristics, a method and device for transmitting a signal for V2X communication in NR are needed.

SUMMARY OF THE INVENTION

A technical object that is to be resolved by the present invention is to provide a method for transmitting a signal by a terminal (or user equipment (UE)) for V2X communication in a wireless communication system and a device using the same method.

In one aspect, provided is a method for transmitting a signal by a user equipment (UE) for vehicle-to-everything (V2X) communication in a wireless communication system. The method includes performing a first group transmission including a first transmission and a first retransmission and performing a second group transmission including a second transmission and a second retransmission. The first group transmission and the second group transmission transmit data, and a resource reservation period for the first group transmission and the second group transmission is equal to half of a resource reservation period of another user equipment (UE) retransmitting the data for a maximum of only 2 times.

The second transmission may be performed after an elapse of a first time gap after performing the first retransmission.

The second retransmission may be performed after an elapse of a second time gap after performing the second transmission.

Sidelink control information (SCI) being transmitted via the first transmission and the first retransmission may include time gap information notifying the first time gap and the second time gap.

The SCI may have a fixed number of bits.

The SCI may include a plurality of fields each including different information, and the time gap information may be transmitted via a remaining number of bits that remain after excluding a total number of bits of the plurality of fields from the fixed number of bits in the SCI.

The first group transmission and the second group transmission may be performed in a same frequency band.

Sidelink control information (SCI) being transmitted via the first transmission and SCI being transmitted via the first retransmission may include information notifying resource position through which SCI of the second transmission is transmitted.

The first group transmission and the second group transmission may be each performed in a different frequency band.

The UE may transmit one of different partial transport blocks being divided from one transport block via each of the first transmission, the first retransmission, the second transmission, and the second retransmission.

The UE may repeatedly transmit a same transport block via the first transmission, the first retransmission, the second transmission, and the second retransmission.

In another aspect, provided is a user equipment (UE). The UE includes a transceiver transmitting and receiving radio signals and a processor being operatively coupled to the transceiver. The processor is configured: to perform a first group transmission including a first transmission and a first retransmission and to perform a second group transmission including a second transmission and a second retransmission. The first group transmission and the second group transmission transmit data, and a resource reservation period for the first group transmission and the second group transmission is equal to half of a resource reservation period of another user equipment (UE) retransmitting the data for a maximum of only 2 times.

According to the present invention, since a V2X signal may be transmitted for a maximum of 4 times, decoding performance (or capability) may be enhanced and reliability of the V2X communication may also be enhanced. Additionally, signaling overhead for retransmission of a V2X signal may be reduced.

DESCRIPTION OF EXEMPLARY EMBODIMENTS

Figure 1:
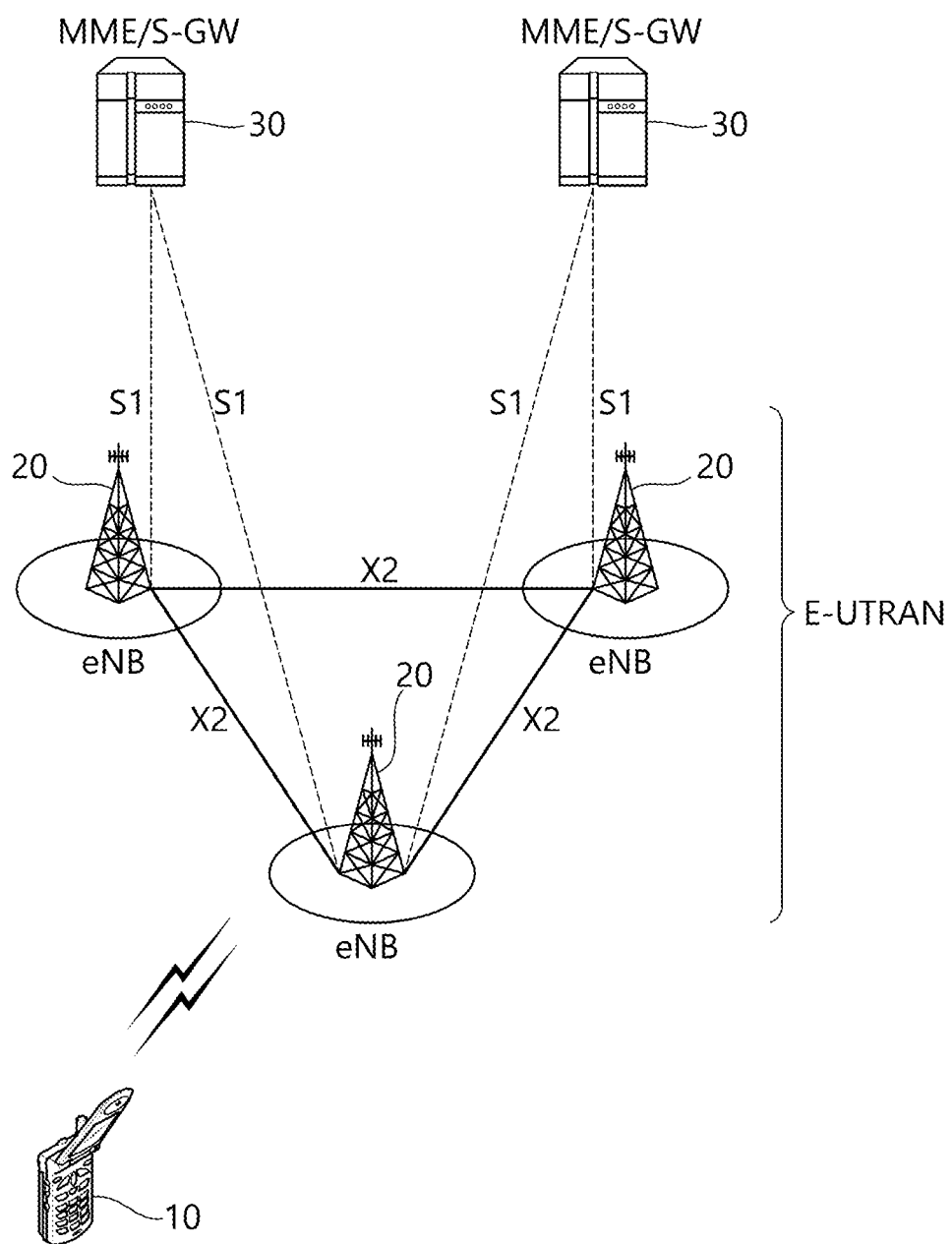
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
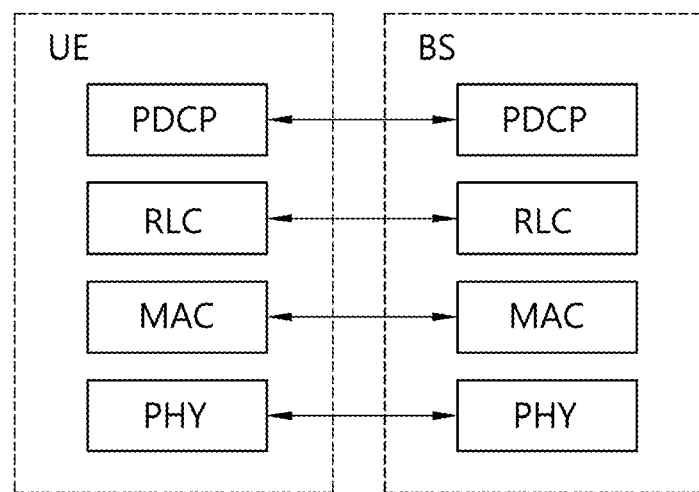
FIG. 2 is a diagram showing a wireless protocol architecture for a user plane.
Figure 3:
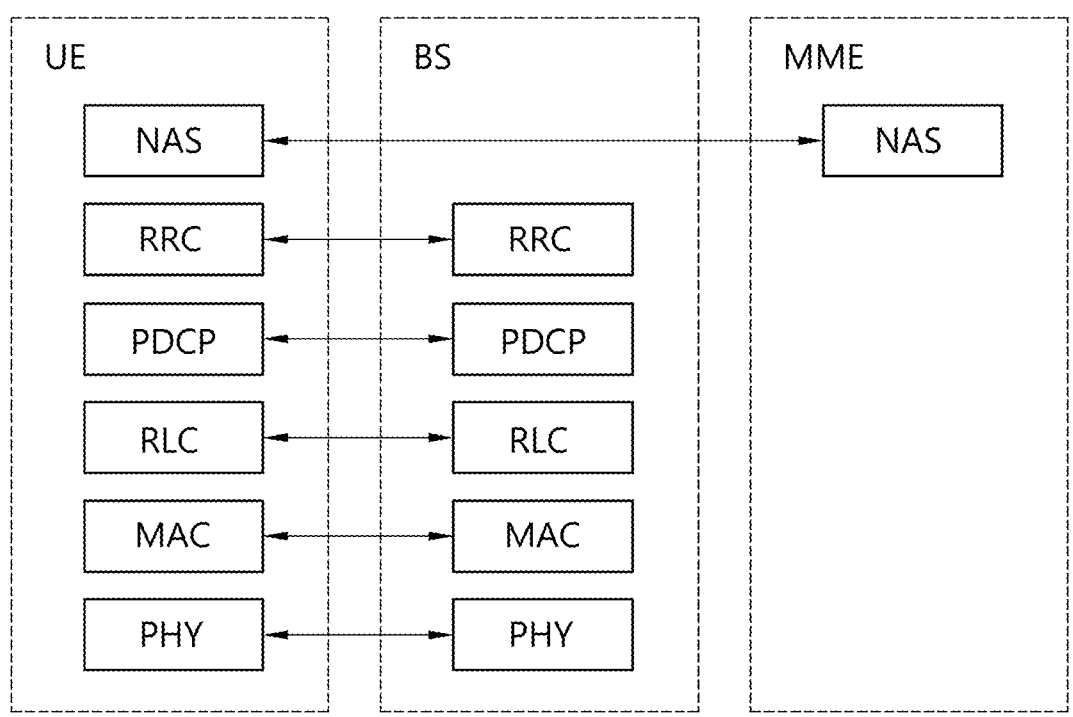
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present invention.

Figure 4:
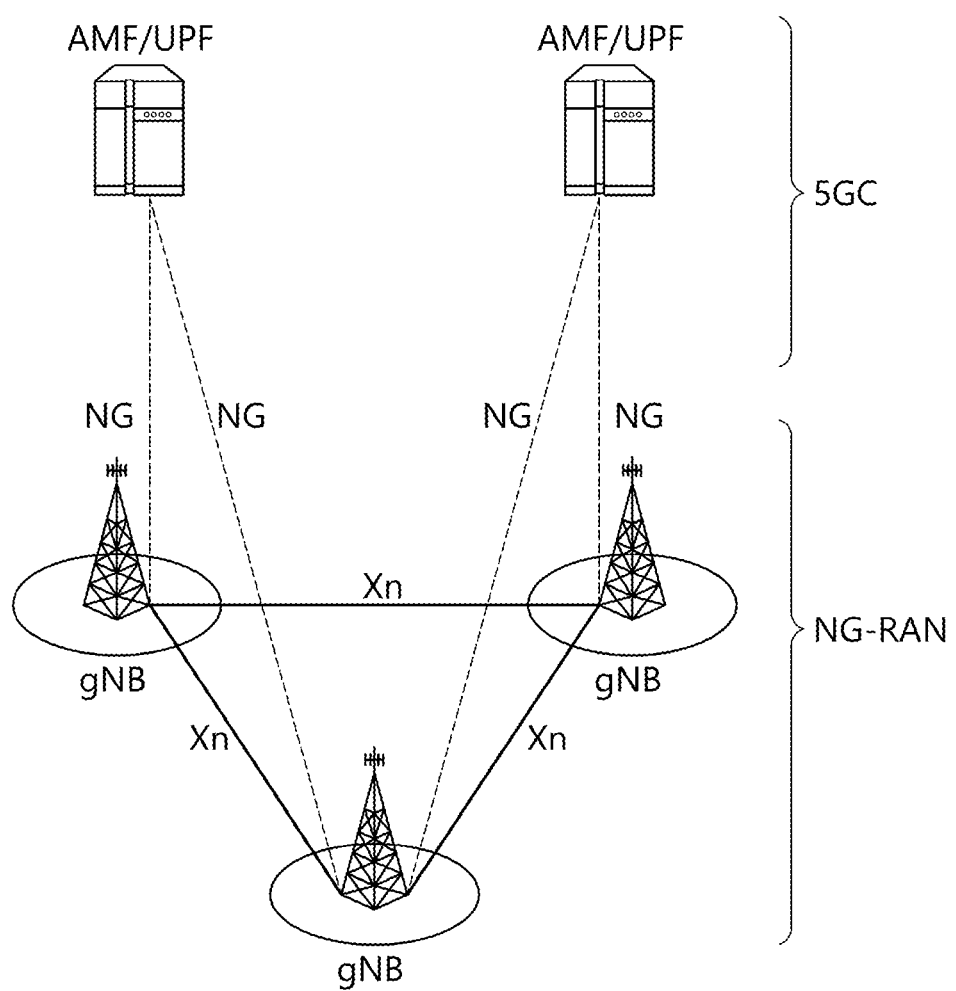
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
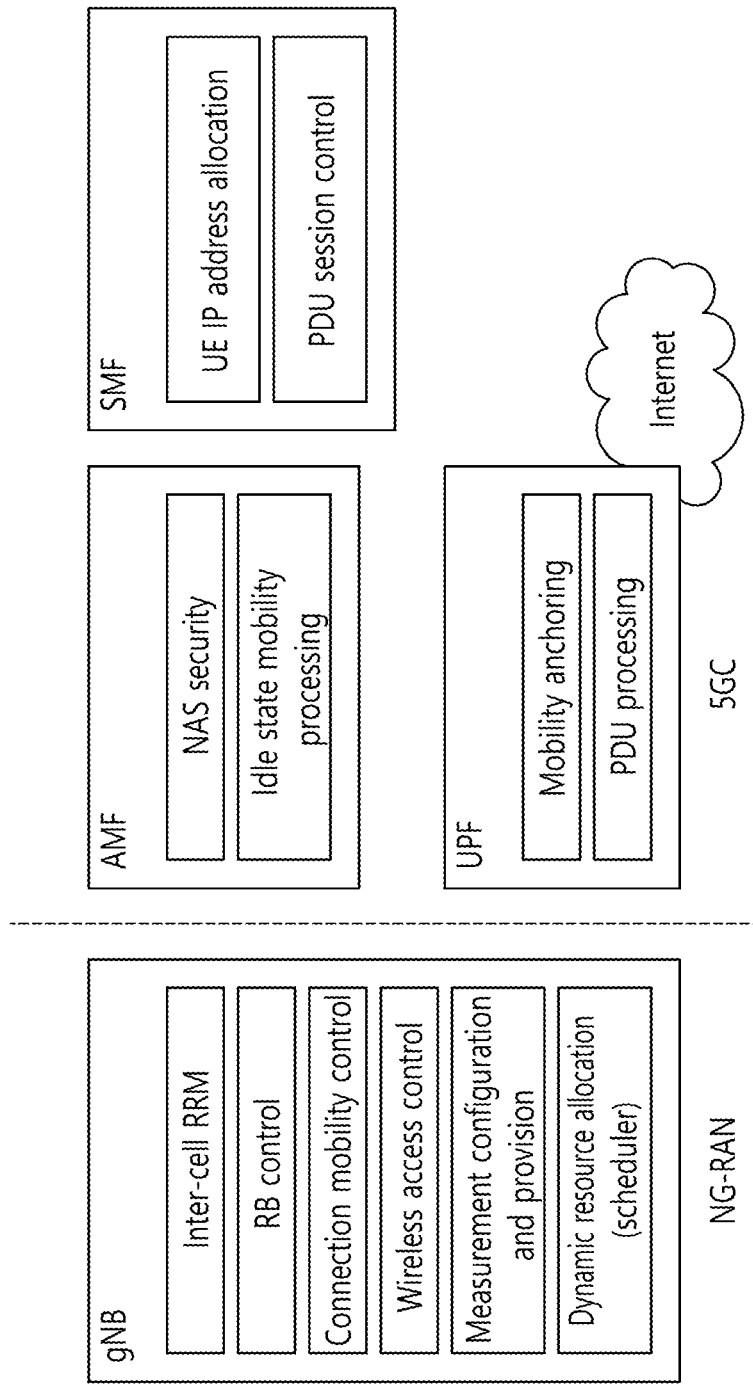
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

The present invention is related to V2X communication and more particularly, to a method for sidelink retransmission. The present invention is described with respect to the V2X communication of the NR but may also be applied to other scenarios including V2V or device-to-device (D2D) communication.

Figure 6:
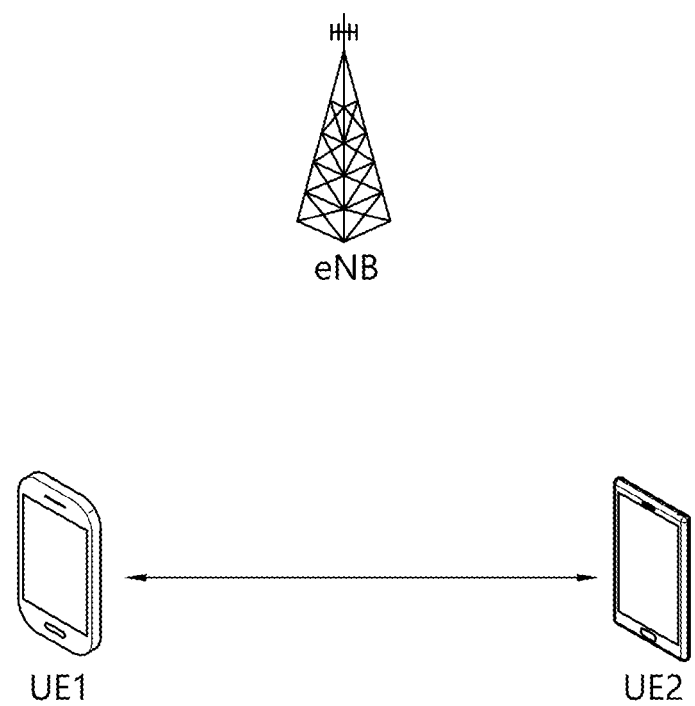
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
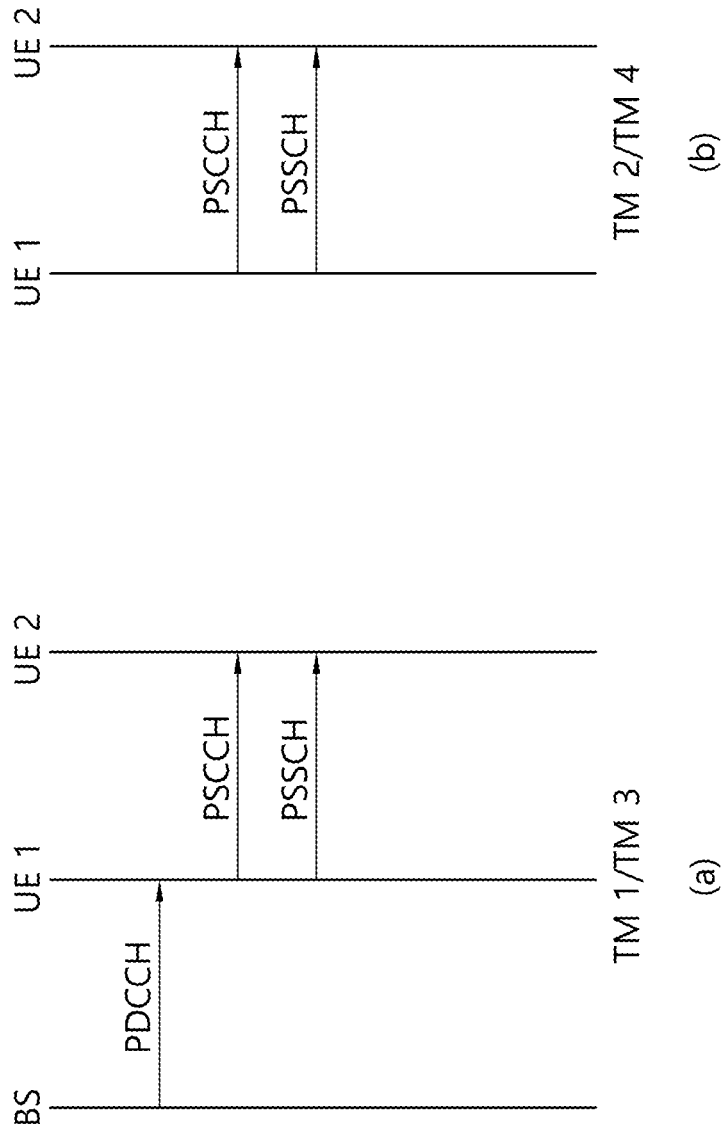
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(a) is related to transmission mode 1, 3 while FIG. 7(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
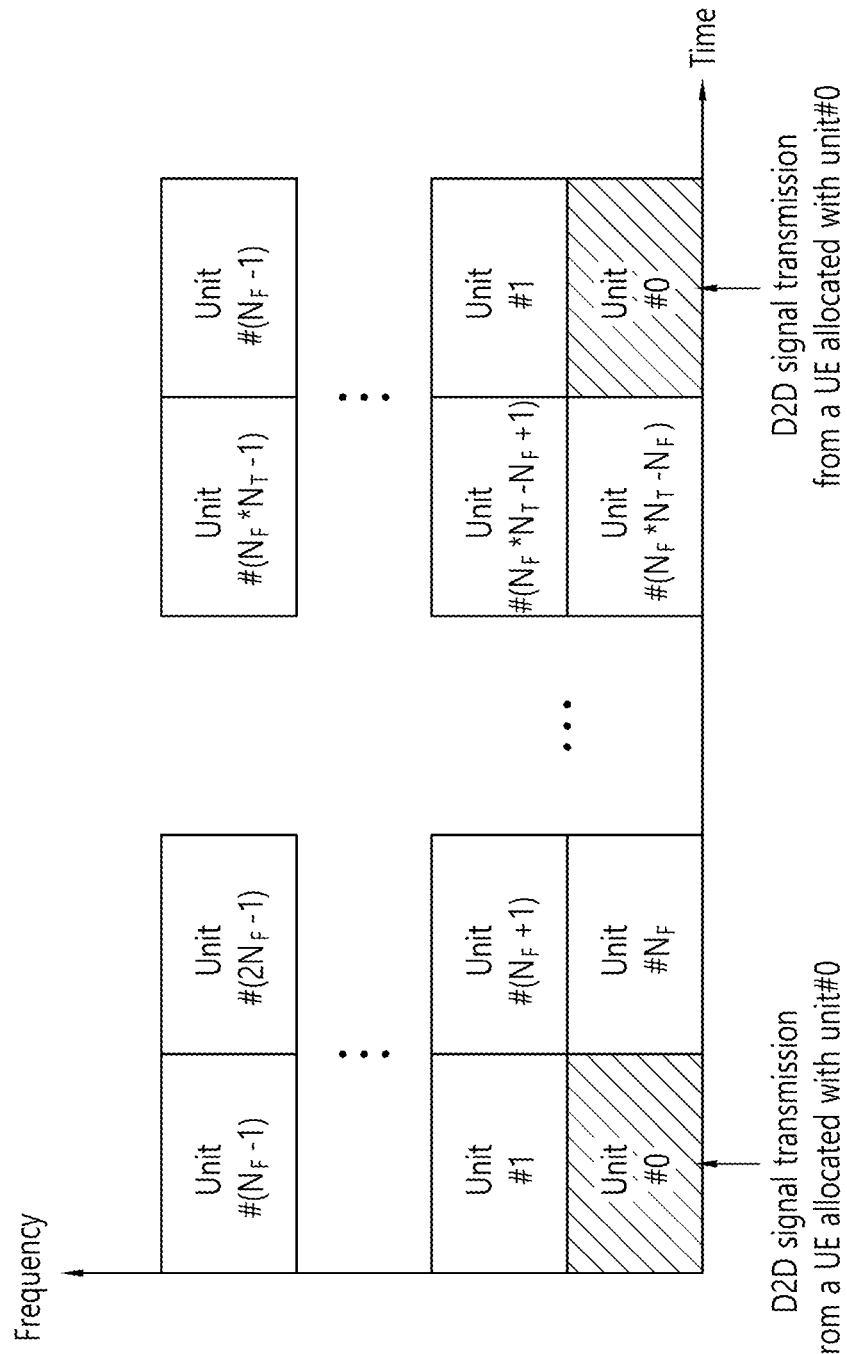
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ sub frames.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Hereinafter, the present invention will be described in detail.

The present invention relates to a sidelink retransmission method in V2X communication of NR. In the legacy LTE system, retransmission of V2V communication may be performed for up to a maximum of 2 times, and, depending upon transmission modes 3 and 4 of the sidelink, a retransmission resource may be allocated from each network, or the UE may select a resource by itself (or autonomously) and may then perform retransmission.

However, in the NR, in case a dedicated frequency resource for V2X communication cannot be allocated and the same band as the legacy LTE frequency resource is used, it will be preferable to satisfy backward compatibility with vehicle-to-vehicle (V2V) communication in the legacy LTE.

The present invention proposes a method for increasing a number of retransmissions for NR while maintaining the retransmission method of the legacy LTE sidelink.

Figure 9:
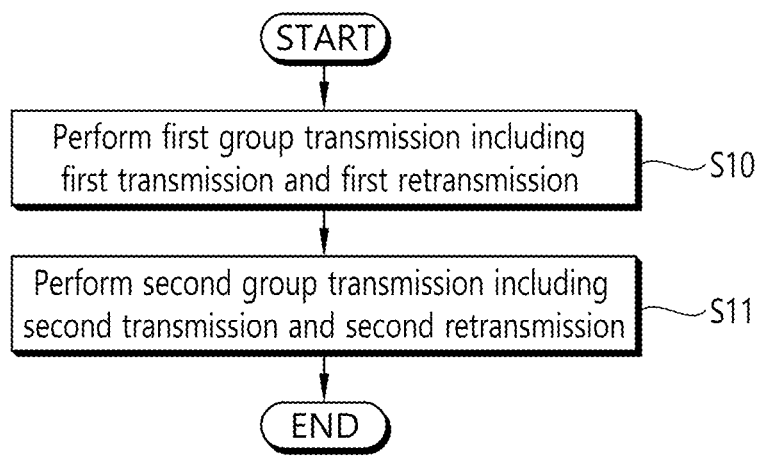
FIG. 9 shows a method for transmitting a signal by a user equipment for V2X communication according to an exemplary embodiment of the present invention.

FIG. 9 shows a method for transmitting a signal by a user equipment for V2X communication according to an exemplary embodiment of the present invention.

Referring to FIG. 9, the UE performs a first group transmission including first transmission and first retransmission (S10) and, then, performs a second group transmission including second transmission and second retransmission (S11).

At this point, the first group transmission and the second group transmission may correspond to a transmission of data being divided from one transport block (TB) and may also correspond to a repeated retransmission of 1 TB.

More specifically, one of different partial transport blocks being divided from one transport block may be transmitted via each of the first transmission, the first retransmission, the second transmission, and the second retransmission, or the same transport block may be repeatedly transmitted from the first transmission, the first retransmission, the second transmission, and the second retransmission.

A resource reservation period for the first group transmission and the second group transmission performed by the UE according to the present invention may correspond to half(=T/2) of a resource reservation period(=T) of another UE, which retransmits the data for only a maximum of 2 times. The UE according to the present invention may correspond to a UE capable of being operated in the NR, and the other UE may correspond to a legacy LTE/LTE-A UE (hereinafter briefly referred to as an LTE UE).

Figure 10:
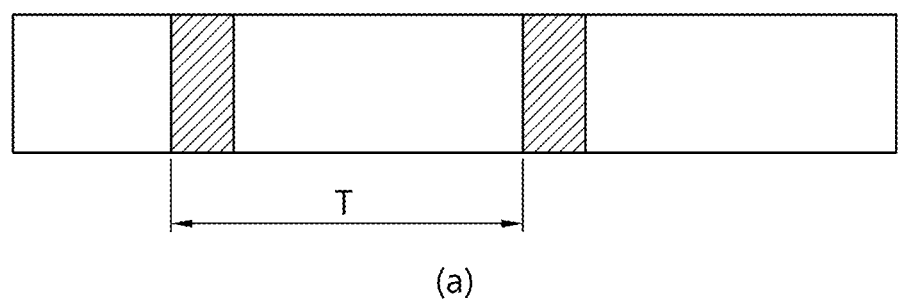
FIG. 10 is a comparison between a resource reservation period for a first group transmission and a second group transmission and a resource reservation period of the legacy LTE UE.
Figure 10:
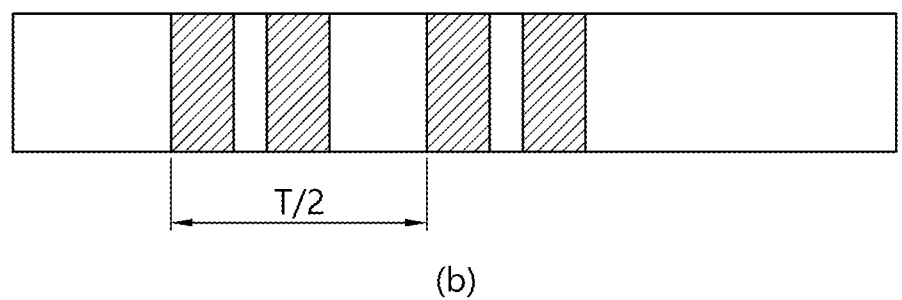

FIG. 10 is a comparison between a resource reservation period for a first group transmission and a second group transmission and a resource reservation period of the legacy LTE UE.

Referring to FIG. 10(a), when a legacy LTE UE performs sidelink transmission, the number of retransmissions may be performed to up to a maximum of 2 times. At this point, the reservation period of the resource may be equal to T. Conversely, referring to FIG. 10(b), when a UE of NR performs sidelink transmission, the number of retransmissions may be performed to up to a maximum of 4 times. And, in this case, the reservation period of the resource may be equal to T/2. More specifically, the reservation period may be scaled down.

For example, in case 1 TB is retransmitted 4 times, as compared to transmitting 1 TB 2 times, the resource reservation period may be scaled down by the UE.

For example, in the case where 1 TB is retransmitted 2 times, when it is given that the resource reservation period is equal to T, in the case where 1 TB is retransmitted 4 times, the resource reservation period becomes equal to T/2. As described above, by down-scaling the reservation period, it may be interpreted by the advanced UE that all of the 4 transmissions correspond to one TB, and it may be interpreted by the legacy receiving UE that 2 transmissions correspond to one TB, just as in the conventional (or legacy) method. At this point, the advanced UE may notify such intentions to another advanced UE by using the reserved bits in the SCI field of the legacy PSSCH.

When performing resource allocation for 3-4 retransmissions, a change (or modification) may be needed in a random selection process after a sensing process during which a PSCCH candidate is excluded.

For example, when it is given that a length of a selection window is equal to 16 ms, the number of cases for selecting 4 resources becomes equal to $_{16}C_4$. However, not all of the number of cases may be tolerated due to the restrictions in signaling. Therefore, in order to prevent impossible combinations from being selected, measures may be taken in advance during the random selection phase (or step). For example, by dividing the selection window of 16 ms by 8 ms, during the first 8 ms, 2 random subframes may be selected so as to be used for a first retransmission group, and, during the second 8 ms, resource of a second retransmission group for TX3 and TX4 may be selected. Thus, a gap (or distance) between the two groups may be reduced to a maximum of 8 ms, and the respective number of signaling bits may also be reduced accordingly.

As another example, although up to 3 subframes are selected within the selection window, if a $4^{th}$ subframe cannot be expressed due to the restrictions in signaling, retransmission may be performed for up to only 3 times while abandoning (or renouncing) the corresponding subframe.

Figure 11:
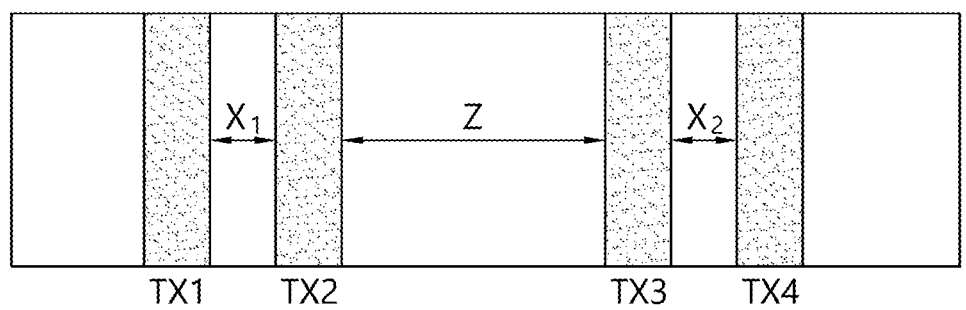
FIG. 11 shows an example of performing a first group transmission and a second group transmission.

FIG. 11 shows an example of performing a first group transmission and a second group transmission.

Referring to FIG. 11, the UE performs transmission 1 (TX1) and TX2 corresponding to a first group, and, after a predetermined period of time, the UE performs TX3 and TX4 corresponding to a second group. In FIG. 11, a time gap between TX1 and TX2 is indicated as $X_1$, and a time gap between TX3 and TX4 is indicated as $X_2$. And, a time gap between the first group and the second group, most particularly, a time gap between TX2 and TX3 is indicated as Z.

Figure 12:
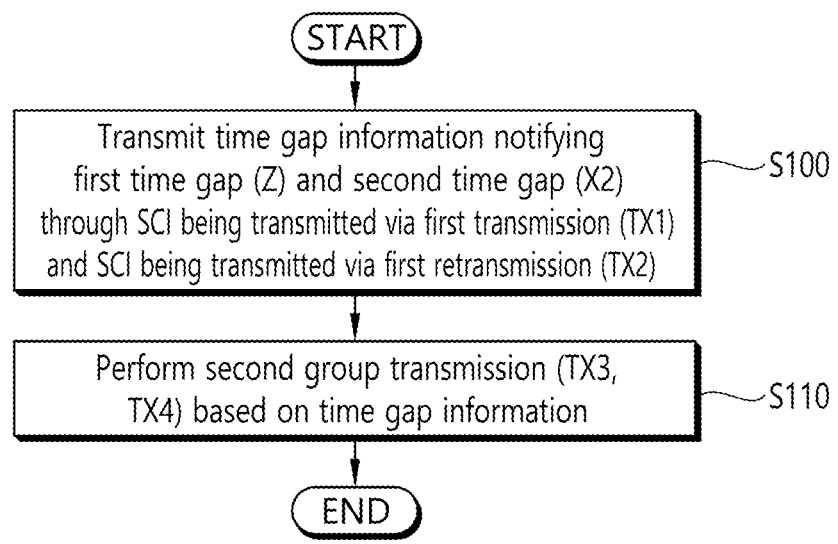
FIG. 12 shows an exemplary signaling method when performing the first group transmission and the second group transmission.

FIG. 12 shows an exemplary signaling method when performing the first group transmission and the second group transmission.

Referring to FIG. 12, time gap information respectively indicating a first time gap (Z) and a second time gap (X2) via SCI being transmitted by a first transmission (TX1) and SCI being transmitted by a first retransmission (TX2) is transmitted (S100), and, based on the time gap information, a second group transmission (TX3 and TX4) is performed (S110).

More specifically, positions of frequency resources through which the first group and the second group are transmitted may be equally maintained. In this case, time gap information notifying additional time gap may be signaled by using reserved bit included in an SCI field of at least one of TX1 and TX2. Herein, additional time gap corresponds to a time gap between the first group and the second group (indicated as Z in FIG. 11) and a time gap between TX3 and TX4 of the second group (indicated as $X_3$ in FIG. 11). As described above, when the SCI includes a plurality of fields each including different information, the reserved bits refer to a remaining number of bits that remain after excluding a total number of bits of the plurality of fields from a fixed number of bits of the SCI.

More specifically, in the present invention, when performing V2X communication, a method of performing retransmission two times in one group while maintaining the existing SCI fields is configured, and, then, group transmission is performed two times. At this point, information on the second group transmission may be signaled through the SCI (most particularly, the reserved bits) of the first group.

For example, as described above, the existing SCI format 1 includes 1) priority (3 bits), 2) resource reservation (4 bits), 3) frequency resource positions of initial transmission and retransmission (the number of bits may vary according to a number of sub-channels of a sidelink), 4) time gap between initial transmission and retransmission (4 bits), 5) MCS (5 bits), 6) retransmission index (1 bit), and 7) reserved information bit, and so on. As described above, a reserved information bit may be briefly referred to as a reserved bit. And, the reserved bit may be added until the bit size of SCI format 1 becomes equal to 32 bits. More specifically, SCI format 1 includes a plurality of fields each including different information, and a remaining number of bits that remain after excluding a total number of bits of the plurality of fields from a fixed total number of bits (32 bits) of SCI format 1 may be referred to as reserved bits. The reserved bits may each be set up to have a zero (0) value in the existing SCI format 1.

The SCI (e.g., SCI format 1) according to the present invention may equally maintain fields 1) to 6) just as the existing (or conventional) SCI format 1. Herein, however, by using the 7) reserved bits, the SCI according to the present invention may transfer (or deliver) information on a second group transmission (e.g., the above-described time gap information, information including indexes of sub-frames or sub-channels including SCI in TX3, which will be described in detail later on, whether or not retransmission, which will be described later on, is performed (or whether or not buffer flushing is performed), and HARQ ID, and so on). At this point, unlike in the conventional SCI format 1, values of the reserved bits may have non-zero values, and the values of the reserved bits may be differently defined/set-up depending upon the information that is to be delivered (or transferred).

According to the above-described method, the UE (herein, the UE may correspond to an advanced UE operating in NR) may maintain the interpretations of the conventional SCI fields, and, herein, the UE may know information on a next group that is to be transmitted through the reserved bits (e.g., time position for the second group transmission). Since the interpretation of the conventional SCI fields is the same, backward compatibility with the legacy LTE may be maintained. And, since the information on the second group transmission may be transferred (or delivered) by using the reserved bits of the conventional SCI, the same number of bits as the number of bits of the conventional SCI is used, and, therefore, an increase in the signaling overhead is not needed.

In order to notify to the UE that the resources being used for the second group transmission are also the resources that are to be used for the retransmission, 1 bit may be additionally allocated to the reserved bits, thereby extending the retransmission index to 2 bits along with the retransmission index of the conventional SCI field.

Since the sidelink retransmission of the legacy LTE system fixes each of its transmission process redundancy version (RV) to 0 or 2, each of the RVs related to TX1/TX3 transmission and TX2/TX4 transmission may be maintained to 0 or 2, or a different RV may be applied for each transmission.

By maintaining the conventional RV as described above, even if any one of the two groups fails to perform decoding or if the UE misses scheduling information related to the retransmission, a guarantee of an accurate decoding likelihood of a retransmission packet may be increased for the UE.

If the above-described time gap information cannot all be loaded in the reserved bits of the SCI (e.g., SCI format 1), the bit size may be reduced by using the method described below.

1) In case of determining a field that notifies the Z value, during a sensing process for PSSCH resource selection, if a selection window is considered only as a partial range instead of a full range, the bit size of the information for notifying the Z value may be reduced. For example, by setting restrictions of not supporting offsets exceeding a predetermined value, or by setting a granularity within a selection window range, 1 bit may be capable of covering multiple subframes. And, therefore, not all of the subframes may be expressed.

2) In case of determining a field that notifies the $X_2$ value, instead of transmitting a time gap ($X_2$) between TX3 and TX4, by transmitting only the information indicating a difference value between the time gap ($X_2$) between TX3 and TX4 and the time gap ($X_1$) between TX1 and TX2, the bit size of a field indicating the $X_2$ value that is to be added to the reserved bits may be reduced.

For example, when transmitting the SCI of TX3 and TX4, all SCI of the first group may be succeeded, and, if a difference value (delta value) between $X_1$ and $X_2$ is signaled via the reserved bits, a time gap for the retransmission may be calculated to have a smaller bit size based on the time gap that is interpreted by the conventional SCI field.

3) If $X_1$ and $X_2$ values are equal to one another, the transmitting UE may only determine the Z value and transmit the determined Z value via the reserved bits of the SCI. Accordingly, since the receiving UE knows the time gaps of both groups, the receiving UE may know all of the time gaps by using the Z value. Additionally, if each of $X_1$, $X_2$, and Z may be equal to the same value, even if only the information on whether or not transmission of TX3 and TX4 is/are performed is indicated via the reserved bits, the receiving UE may be capable of knowing all of the time gaps.

Figure 13:
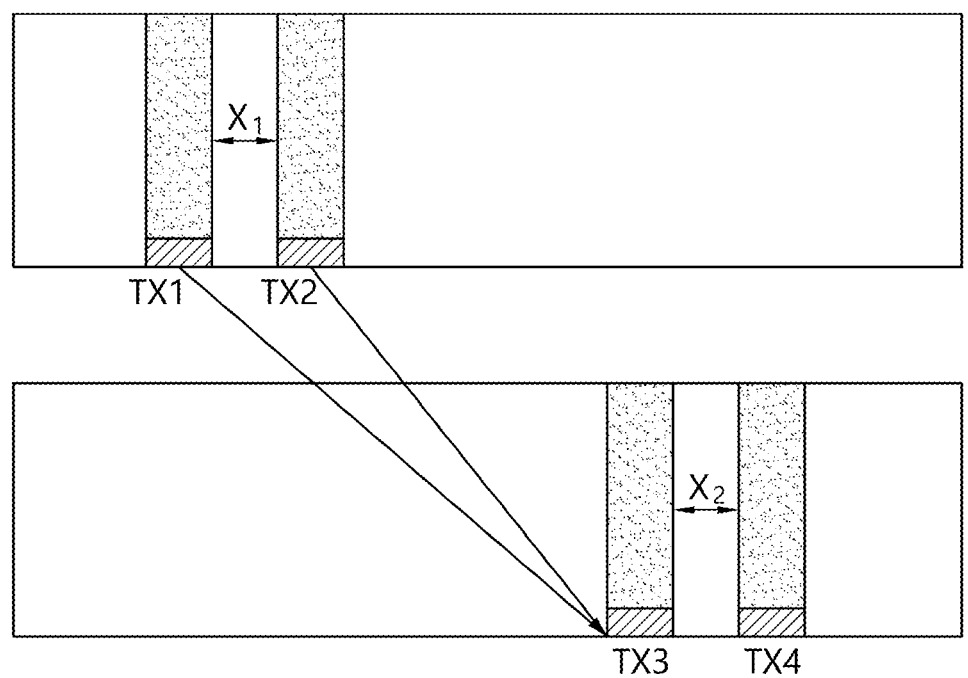
FIG. 13 shows an example of a method for transmitting a V2X signal according to another exemplary embodiment of the present invention.

FIG. 13 shows an example of a method for transmitting a V2X signal according to another exemplary embodiment of the present invention.

Referring to FIG. 13, the UE performs TX1 and TX2 corresponding to a first group, and, after a predetermined period of time, the UE performs TX3 and TX4 corresponding to a second group. At this point, unlike the method shown in FIG. 11, a frequency resource position of the second group transmission and a frequency resource position of the first group transmission may be different from one another.

In this case, the position of the SCI information corresponding to the second group (most particularly, TX3) may be notified by using the reserved bits of the SCI without signaling the time gap information of the first group.

Figure 14:
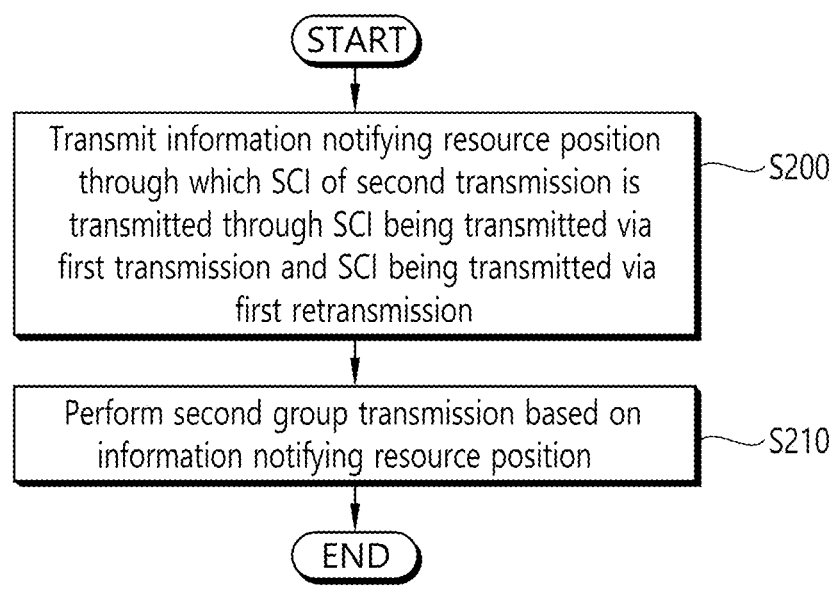
FIG. 14 shows exemplary UE operations (or behaviors) in the case shown in FIG. 13.

FIG. 14 shows exemplary UE operations (or behaviors) in the case shown in FIG. 13.

Referring to FIG. 14, a transmitting UE may transmit information indicating the position of a resource, through which the SCI of the second transmission (TX3) is transmitted, through the SCI being transmitted via first transmission (TX1) and the SCI being transmitted via first retransmission (TX2) (S200). Based on the information notifying the resource position, the transmitting UE may perform a second group transmission (TX3 and TX4) (S210).

For example, information including indexes of subframes or sub-channels including SCI in TX3 may be notified via the reserved bits of the SCI being transmitted via TX1 and TX2. Accordingly, the UE may receive/decode the SCI of TX3 from the position notified by the reserved bits and may recognize the accurate information between the two transmissions (TX3 and TX4) of the second group.

At this point, additional indication may be needed in the reserved bits in order to notify to the receiving UE that TX3 and TX4 are transmitted from the same transmitting UE, which has transmitted TX1 and TX2.

TX1 and TX2 of the first group may both notify the SCI position of TX3, and, in this case, even if any one of the SCI decoding has failed in the first group, it may be possible to recognize the corresponding position of the second group and perform HARQ combining (or combination). Thus, reliability in the V2X communication may be increased.

Meanwhile, whether or not retransmission is performed (or whether or not buffer flushing is performed) and HARQ ID may be signaled without signaling the above-described time gap information via the reserved bits of the SCI.

Herein, whether or not retransmission is performed may correspond to information indicating to the receiving UE whether or not retransmission of the second group is performed from the transmitting UE, and HARQ ID corresponds to information identifying a transmitting UE that has transmitted the retransmitted information.

Based on the decoding result of the PSSCH, if the receiving UE verifies whether or not additional retransmission is performed via the reserved bits, for the packets being retransmitted, the buffer is not emptied and waits until the same HARQ ID is sensed. Thereafter, a combination (or combining) may be performed by using the sensed HARQ ID.

At this point, in order to prevent excessive buffering from occurring, it may be assumed that a gap between the first group and the second group is equal to or less than a predetermined length.

Additionally, in case the SCI of the additional retransmission resource fails to be received, after the initial reception, a rule of automatically emptying the buffer after a predetermined number of subframes may be needed.

Alternatively, scheduling information related to the transmission of TX3 and TX4 of the second group may be transmitted through a PSSCH data region instead of a PSSCH SCI field.

Among the 32 bits of SCI format 1 of the LTE system, the number of bits that may be used as the reserved bits is equal to a maximum of 7 bits. If the subframe gap, frequency position, and so on, of each transmission group is different from one another, and if the offset range is too broad to allow the corresponding information to all be carried in the reserved bits, the corresponding information may be transmitted (e.g., piggy-backed) from the PSSCH region along with the data.

For example, in case the transmitting UE needs up to TX3 and TX4, a method of providing only indication on yet another retransmission by using the reserved bits of the PSCCH, and separately allocating actual scheduling information to a partial region among the PSSCH resources, thereby multiplexing control information for TX3 and TX4 scheduling may be used.

When describing the retransmission of a V2X signal, although an example of performing retransmission 4 times given in this specification, the present invention will not be limited only to this. More specifically, the present invention may also be applied to a case where retransmission is performed up to only 3 times. When performing retransmission 3 times, there may exist a case where the first group may be transmitted 2 times and the second group may be transmitted 1 time, or a case where the first group may be performed 1 time and the second group may be transmitted 2 times. In case of the former example, in a situation where a time gap (between initial transmission and retransmission) of the SCI of the first group is equal to a non-zero value, a number of subframes being used by the second group may be indicated. In case of the latter example, although the first SCI time gap field is equal to 0, if it is indicated that additional retransmission information may exist in the second group, the receiving UE may not attempt to perform buffer flushing for the HARQ combining (or combination).

Although this specification has been written while focusing on the V2X communication of the NR, it will be apparent that the usage (or application) of the present invention in other scenarios, such as the current V2V or D2D communication, and so on will not be excluded. Additionally, the present invention may also be applied to network-to-device communication.

Figure 15:
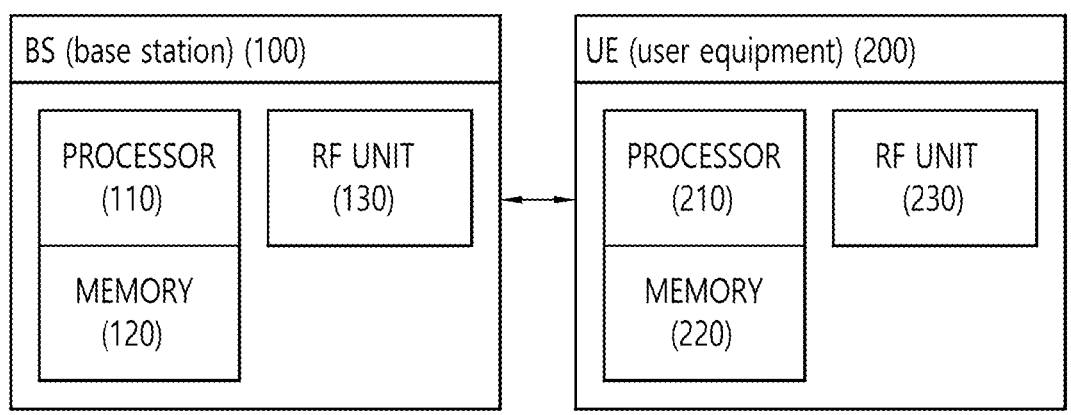
FIG. 15 is a block diagram illustrating a communication device implementing an exemplary embodiment of the present invention.

FIG. 15 is a block diagram illustrating a communication device implementing an exemplary embodiment of the present invention.

Referring to FIG. 15, a base station (BS) (100) includes a processor (110), a memory (120), and a radio frequency (RF) unit (130). The processor (110) implements proposed functions, processes and/or methods. The memory (120) is connected to the processor (110) and stores various information for driving the processor (110). The RF unit (130) is connected to the processor (110) and transmits and/or receives radio signals. The RF unit (130) may also be referred to as a transceiver.

A user equipment (UE) (200) includes a processor (210), a memory (220), and a radio frequency (RF) unit (230). The processor (210) implements proposed functions, processes and/or methods. The memory (220) is connected to the processor (210) and stores various information for driving the processor (210). The RF unit (230) is connected to the processor (210) and transmits and/or receives radio signals. The RF unit (230) may also be referred to as a transceiver. The UE (200) may transmit/retransmit a V2X signal to another UE according to the above-described method.

The processor (110, 210) may include an application-specific integrated circuit (ASIC), a separate chipset, a logic circuit, a data processing unit, and/or a converter inter-converting baseband signals and radio signals. The memory (120, 220) may include a read-only memory (ROM), a random access memory (RAM), a flash memory, a memory card, a storage medium, and/or other equivalent storage devices. The RF unit (130, 230) may include one or more antennas transmitting and/or receiving radio signals. When the embodiment is implemented as software, the above-described methods may be implemented as a module (i.e., process, function, etc.) for performing the above-described functions. The module may be stored in the memory (120, 220) and may be performed by the processor (110, 210). The memory (120, 220) may be located inside or outside the processor (110, 210) and may be coupled to the processor (110, 210) by using various well-known means.

What is claimed is:

1. A method performed by a user equipment (UE) in a wireless communication system, the method comprising:
identifying a selection window;
performing a sensing during the selection window;
selecting a first resource for an earliest transmission, among at least one transmission of a transport block (TB) during the selection window, in the selection window;
performing a first transmission for the TB through the first resource;
selecting a second resource in the selection window;
performing a first retransmission for the TB through the second resource;
selecting a third resource in the selection window;
performing a second transmission through the third resource;
selecting a fourth resource in the selection window; and
performing a second retransmission related to the second transmission through the fourth resource,
wherein the first resource is selected within at least one resource, available to the UE for transmission, that are earliest in the selection window,
wherein the third resource and the fourth resource are selected within resources except for the at least one resource, and
wherein the second transmission and the second retransmission are performed to transmit the TB.

2. The method of claim 1, wherein the earliest transmission is an initial transmission of the TB.

3. The method of claim 1, wherein the selection window includes at least one first sub-window and at least one second sub-window, and
wherein each of the at least one first sub-window and the at least one second sub-window has a length that is equal to a half of a length of the selection window in a time domain.

4. The method of claim 1, wherein a first resource reservation period for the first transmission, the first retransmission, the second transmission, and the second retransmission is equal to half of a second resource reservation period of another UE performing a retransmission up to two times.

5. The method of claim 4, wherein the UE perform a vehicle-to-everything (V2X) transmission based on a new radio (NR) technology and the another UE performs another V2X transmission based on a long term evolution (LTE) technology.

6. The method of claim 5, wherein the UE performs the V2X transmission on a same frequency band which the another UE performs the another V2X transmission on.

7. The method of claim 4, wherein the second transmission is performed after an elapse of a first time gap after performing the first retransmission, and
wherein the second retransmission is performed after an elapse of a second time gap after performing the second transmission.

8. The method of claim 7, wherein the performing of a first group transmission including the first transmission and the second transmission comprises,
transmitting sidelink control information (SCI) and the TB,
wherein the SCI includes time gap information notifying the first time gap and the second time gap.

9. The method of claim 7, wherein the performing of a first group transmission including the first transmission and the first retransmission comprises,
transmitting SCI and the TB,
wherein the SCI includes information notifying that the first transmission, the first retransmission, the second transmission and the second retransmission correspond to the TB.

10. A user equipment (UE) configured to operate in a wireless communication system, the UE comprising:
a transceiver; and
a processor coupled to the transceiver and configured to:
identify a selection window;
perform a sensing during the selection window;
select a first resource for an earliest transmission, among at least one transmission of a transport block (TB) during the selection window, in the selection window;
perform a first transmission for the TB through the first resource;
select a second resource in the selection window;
perform a first retransmission for the TB through the second resource;
select a third resource in the selection window;
perform a second transmission through the third resource;
select a fourth resource in the selection window; and
perform a second retransmission related to the second transmission through the fourth resource,
wherein the first resource is selected within at least one resource, available to the UE for transmission, that are earliest in the selection window,
wherein the third resource and the fourth resource are selected within resources except for the at least one resource, and
wherein the second transmission and the second retransmission are performed to transmit the TB.

11. The UE of claim 10, wherein the earliest transmission is an initial transmission of the TB.

12. The UE of claim 10, wherein the selection window includes at least one first sub-window and at least one second sub-window, and
wherein each of the at least one first sub-window and the at least one second sub-window has a length that is equal to a half of a length of the selection window in a time domain.

* * * * *